US007890247B2

(12) United States Patent
Cole

(10) Patent No.: US 7,890,247 B2
(45) Date of Patent: Feb. 15, 2011

(54) SYSTEM AND METHOD FOR FILLING AVAILABLE AIRSPACE WITH AIRPLANES

(75) Inventor: James Cole, East Setauket, NY (US)

(73) Assignee: PASSUR Aerospace, Inc., Stamford, CT (US)

( * ) Notice: Subject to any disclaimer, the term of this patent is extended or adjusted under 35 U.S.C. 154(b) by 777 days.

(21) Appl. No.: 11/863,716

(22) Filed: Sep. 28, 2007

(65) Prior Publication Data

US 2008/0133119 A1 Jun. 5, 2008

Related U.S. Application Data

(60) Provisional application No. 60/847,695, filed on Sep. 28, 2006.

(51) Int. Cl.
*G06F 9/00* (2006.01)

(52) U.S. Cl. .......................................... 701/120; 701/16

(58) Field of Classification Search ..................... 701/3, 701/4, 6, 8, 14, 16, 120, 121, 122, 223, 300, 701/301; 340/941, 945, 951, 961, 971; 342/454
See application file for complete search history.

(56) References Cited

U.S. PATENT DOCUMENTS 4,890,232 A * 12/1989 Mundra ...................... 701/120
7,385,527 B1 * 6/2008 Clavier et al. ............... 340/945
7,412,324 B1 * 8/2008 Bagge et al. ................ 701/120

* cited by examiner

*Primary Examiner*—Richard M. Camby
(74) *Attorney, Agent, or Firm*—Fay Kaplun & Marcin, LLP

(57) ABSTRACT

A system and method for determining a minimum spacing requirement for each of a plurality of aircraft landings, determining an actual spacing for each of the plurality of aircraft landings, calculating an efficiency score based on the actual spacing and the minimum spacing requirements for the plurality of aircraft landings and displaying the efficiency score to a user.

20 Claims, 3 Drawing Sheets

SYSTEM AND METHOD FOR FILLING AVAILABLE AIRSPACE WITH AIRPLANES

PRIORITY CLAIM/INCORPORATION BY REFERENCE

This application claims the benefit of U.S. Provisional Patent Application 60/847,695 filed on Sep. 28, 2006 and entitled "SYSTEM AND METHOD FOR FILLING AVAILABLE AIRSPACE WITH AIRPLANES" and is expressly incorporated herein, in its entirety, by reference.

BACKGROUND INFORMATION

Airport delays may be caused by a variety of factors including weather, equipment failure, lack of gates, flight overload or general inefficient operation. In order to reduce airport delays, airlines and airport operators need to gain efficiency wherever possible.

SUMMARY OF THE INVENTION

A method for determining a minimum spacing requirement for each of a plurality of aircraft landings, determining an actual spacing for each of the plurality of aircraft landings, calculating an efficiency score based on the actual spacing and the minimum spacing requirements for the plurality of aircraft landings and displaying the efficiency score to a user.

A system having a calculation arrangement receiving a minimum spacing requirement and an actual spacing for each of a plurality of aircraft landings and calculating an efficiency score based on the actual spacing and the minimum spacing requirements for the plurality of aircraft landings and a data distribution arrangement for generating a displayable file and distributing the efficiency score to users of the system.

DETAILED DESCRIPTION

Figure 1:
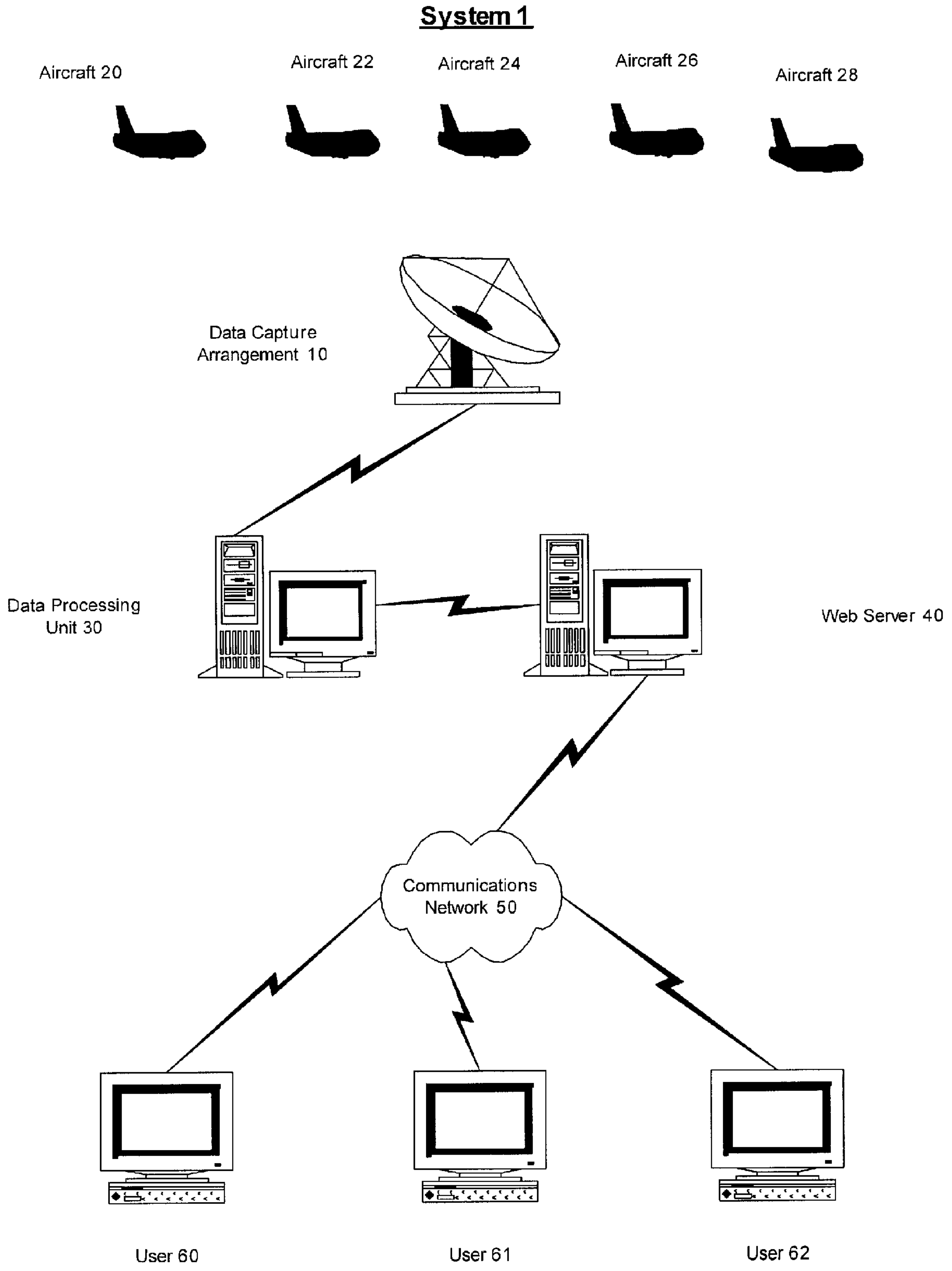
FIG. 1 shows an exemplary system according to the present invention.

The exemplary embodiments of the present invention provide an airport efficiency monitoring system for delivery of information via a communication network which may be, for example, the Internet, a corporate intranet, etc. The information that is provided to the users (e.g., via a graphical user interface such as a World Wide Web browser) includes an efficiency value relating to an amount of airspace that is being used in the vicinity of an airport. The exemplary embodiments of the present invention are described as a web based system; however, those skilled in the art will understand that there may be any number of other manners of implementing the present invention in embodiments that are not web based. The present invention may be further understood with reference to the following description and the appended drawings, wherein like elements are referred to with the same reference numerals.

FIG. 1 illustrates an exemplary system 1 according to the present invention. A data capture arrangement 10 obtains data relating to the operation of a plurality of aircraft 20, 22, 24, 26 and 28. In this exemplary embodiment, the data capture arrangement 10 may include one or more Passive Secondary Surveillance Radar ("PSSR") systems. A PSSR system may be, for example, the PASSUR® system sold by Megadata Corporation of Greenwich, Conn. Data collected by the data capture arrangement 10 may include, but is not limited to, a location of arriving aircraft. Those skilled in the art will understand that the exemplary embodiments are described with reference to a PSSR system. However, the present invention is not limited to collecting location data using a PSSR system. The data capture arrangement may be any system that collects, directly or indirectly, location data on aircraft With the exception of many small airports that serve general aviation, larger airports generally have a Secondary Surveillance Radar ("SSR") system. SSR includes a rotating radar that sends interrogation signals at a frequency of 1030 MHz to aircraft in the vicinity of the airport. Transponders aboard aircraft respond to the interrogations by transmitting a response signal back to the radar at a frequency of 1090 MHz. In addition to the SSR, a PSSR may be sited near the airport grounds. PSSR may include two antenna systems: a fixed, directional high gain 1030 MHz antenna aimed toward the SSR for receiving the interrogation signals; and a stationary array of directive antennas arranged in a circle to detect the 1090 MHz responses from the aircraft transponders. PSSR's may be placed at known distances and directions from a corresponding SSR.

Using the time relationships between received signals, i.e., the interrogations and responses, the known distances from the SSR, and the known direction from each PSSR to the SSR, the PSSR determines the location of aircraft relative to a reference location, e.g., the airport. Response signals from the aircraft received by PSSR include Mode A transponder beacon signals, Mode C transponder beacon signals and Mode S transponder beacon signals. The Mode A signal comprises a four (4) digit code which is the beacon code identification for the aircraft. The Mode C signal additionally includes altitude data for the aircraft. The Mode S signal is either a 56 bit surveillance format having a 32 bit data/command field and a 24 bit address/parity field or a 112-bit format allow for the transmission of additional data in a larger data/command field. PSSR receives the beacon code and altitude data from the received signals and calculates aircraft position (e.g., range, azimuth) and ground speed based on the timing of the receipt of the signals and the known radar locations. Thus, position information or target data points for each of the aircraft is derived based on the physical characteristics of the incoming signals, rather than based on position data contained in the signal itself.

The data capture arrangement 10 conveys some or all of the recorded data to a processing unit 30. The processing unit 30 may be, for example, a standard PC based server system running an operating system such as LINUX. Those skilled in the art will understand that any computing platform may be used for the processing unit 30. The processing unit 30 analyzes the raw data from the data capture arrangement to determine one or more results requested by users 60-62.

In one exemplary embodiment, the data collected by the passive radar is used to calculate an efficiency score relating to aircraft separation. Arriving aircraft must maintain a minimum separation for safety reasons. However, any additional space above the minimum separation results in inefficient operation because more aircraft could be placed in the landing pattern if the spacing between aircraft were smaller. Thus, the exemplary embodiments calculate an efficiency score to measure the aircraft separation.

A goal of the exemplary embodiments is to use the efficiency score to provide perfect data and high demand. Perfect data indicates that the aircraft's position is known precisely at any given time. However, in practical application, it is not always possible to know the precise location of an aircraft. Thus, the exemplary embodiments factor in an error boundary in the efficiency score calculation. High demand means that there are no gaps caused by a lack of an aircraft to fill empty space. For example, there may be periods of low demand (e.g., late at night). It is not essential to have a high efficiency score at these times because even if the available aircraft were closer together, gaps in the landing pattern may still occur because there are just not enough aircraft that are attempting to land at these low demand times.

Figure 2:
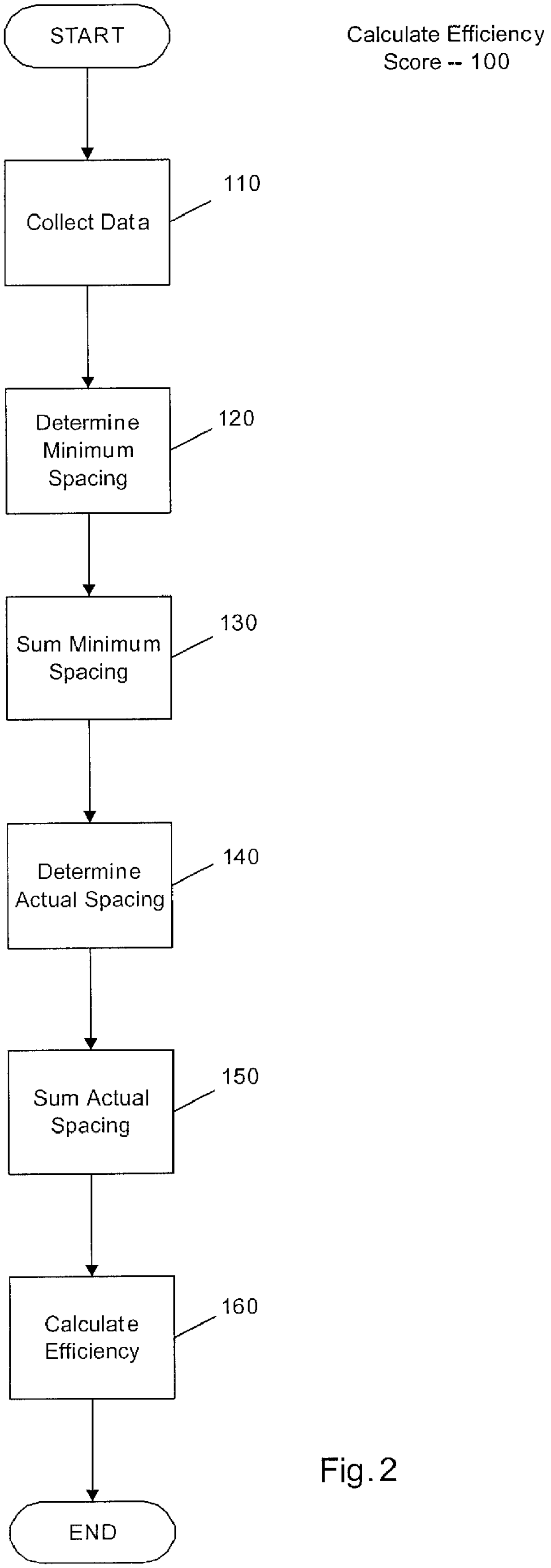
FIG. 2 shows a first exemplary method for calculating an efficiency score for aircraft spacing according to the present invention.

FIG. 2 shows a first exemplary method 100 for calculating an efficiency score. In step 110 aircraft location data is collected over a defined time interval. The time interval may be based on any number of factors. For example, the time interval may be defined as any contiguous time block such as 1 hour, 3 hours, 5 hours, etc. In another example, the time interval may be defined in terms of a number of aircraft landings such as 50 landings, 100 landings, etc. In a further example, the time interval may be based on a period of use such as a defined high demand period such as between 8 am and 8 pm. In another exemplary embodiment, a user may be able to interact with the system 1 in order to define a time interval of interest. Thus, the system 1 will collect and store the relevant location data for the aircraft.

In step 120, the system 1 determines the minimum spacing for each landing. Those skilled in the art will understand that minimum spacing requirements may change over time based on a variety of factors. For example, minimum spacing may be based on a weather condition at the airport, a type of aircraft, a size of the aircraft, etc. Thus, in step 120, for the defined time period, the system 1 will determine the minimum spacing requirements for each landing. In step 130, the minimum spacing requirements for each landing in the defined time period are summed.

In step 140, the system 1 will determine the actual spacing between the aircraft landings using the collected data. In step 150, the actual spacings are summed in a manner similar to the summation of the minimum spacing requirements in step 130. Finally, in step 160 the efficiency score is calculated by, for example, by dividing the sum of the minimum spacing requirements (step 130) by the sum of the actual spacings (step 150).

The following provides an exemplary calculation using the above method 100. In the example calculation, the time interval is defined as 50 landings. It is determined that the minimum spacing for the entire set of the 50 landings is a constant 2.5 miles. Thus, the sum of the minimum spacing requirements for the defined time interval is 125 miles (50×2.5 miles). The actual spacings have an average value of 2.9 miles based on the collected data. Thus, the sum of the actual spacings is 145 miles (50×2.9 miles). The efficiency score may then be calculated to be 0.862 or 86.2% (125 miles/145 miles).

Thus, a user of system 1 may then use the calculated efficiency score to implement changes to improve efficiency if the score is below a predetermined threshold. For example, if the efficiency score is below 90% as in the above example, the user may contact air traffic control to indicate that the landing pattern should be tightened because there is too much space between landing aircraft.

As described above, the calculation of the efficiency score may be adapted to ignore those times of the day that are not high demand, i.e., where there is not enough aircraft to fill in any gaps in the landing pattern. Thus, a high demand time may be defined for the airport and any landings occurring outside these defined times may be ignored for the purpose of calculating the efficiency score.

As also described above, the collected location data may not be precise. However, the efficiency scores may be adjusted in a variety of manners to compensate for imprecise location data. For example, it may be assumed that the location data has an error of ±0.1 miles. When the calculation is performed the actual location data may be adjusted by 0.1 miles in the conservative direction (e.g., if the actual location data shows a 2.9 mile gap, it may be adjusted to 2.8 miles) to account for any errors in actual position. In another example, the threshold for action based on the efficiency score may be adjusted to accommodate certain positional inaccuracies. For example, instead of setting a threshold for action at 90%, the threshold may be set at 88% to account for potential positional inaccuracies.

However, in addition to positional inaccuracies, some aircraft may be missed altogether for a variety of reasons. These missed aircraft may substantially change the efficiency score and result in an incorrect action being taken. Accordingly, the exemplary embodiments may employ error checking procedures to determine if the collected location data is accurate.

Figure 3:
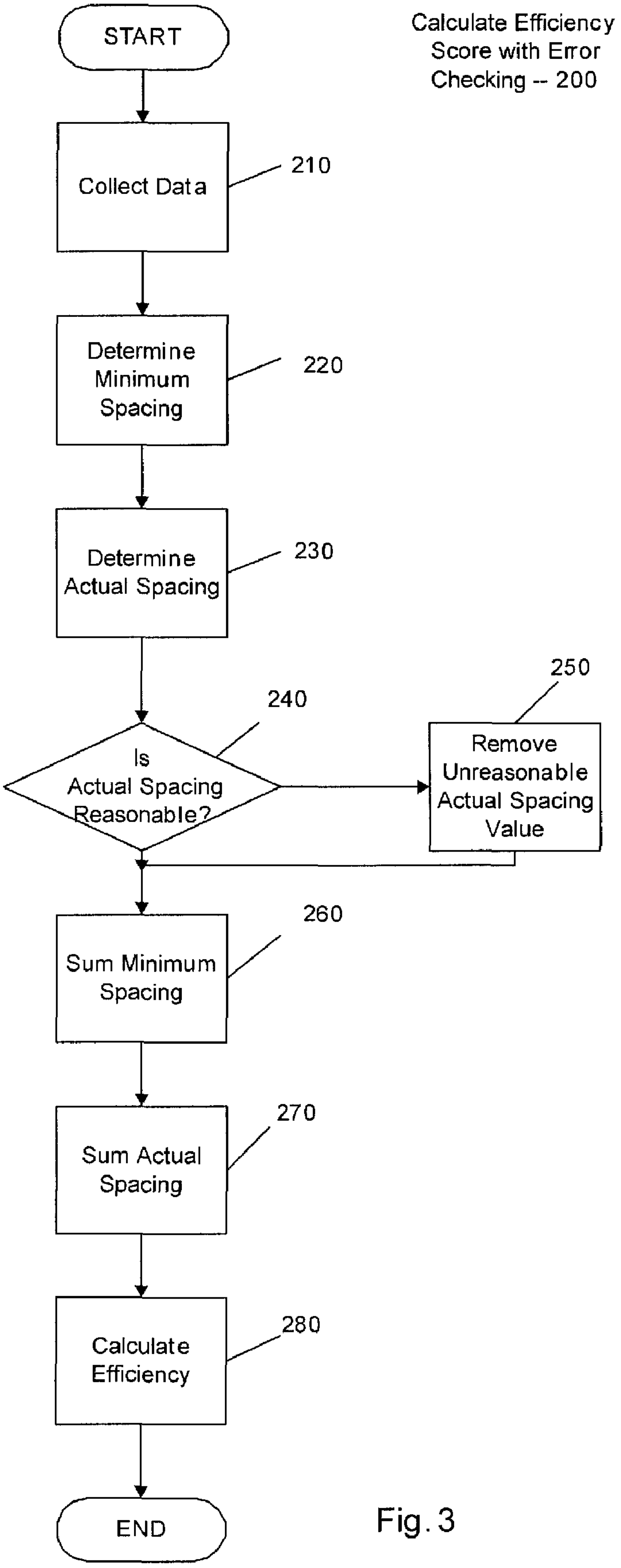
FIG. 3 shows a second exemplary method for calculating an efficiency score for aircraft spacing according to the present invention.

FIG. 3 shows a second exemplary method 200 for calculating an efficiency score that includes an error checking procedure. Steps 210 for collecting data and 220 for determining minimum spacing requirements may be the same as steps 110 and 120, respectively, described above. Similarly, step 230 for determining actual spacings may be the same as step 140 described above.

In step 240, a determined actual spacing is checked to determine if it is a reasonable value. The reasonableness of the value may be checked in the following manner. The system 1 may assume that there was an undetected aircraft between two detected aircraft. It may assume that the undetected aircraft was a common type for the airport and then may calculate a first minimum spacing requirement between the first detected aircraft and the undetected aircraft and a second minimum spacing requirement between the undetected aircraft and the second detected aircraft. If the actual spacing between the first and second detected aircraft is less than the sum of the calculated first and second minimum spacing requirements, it may then be assumed that the actual spacing is a reasonable value, i.e., there was no undetected aircraft between the detected aircraft. If the actual spacing between the first and second detected aircraft is greater than the sum of the calculated first and second minimum spacing requirements, it may then be assumed that the actual spacing is an unreasonable value, i.e., there was an undetected aircraft between the detected aircraft. Those skilled in the art will understand that the reasonableness determination of step 240 may be performed for each actual spacing data. It should be noted that the calculation may be varied depending on a variety of factors. For example, the determination may be based on a percentage of the calculated minimum spacing requirements such as an unreasonable value may be if the actual spacing is 125% of the sum of the minimum spacing requirements.

If it is determined in step 240 that the actual spacing data is unreasonable, that data may be ignored or removed from the efficiency score calculation (step 250). It should be noted that the minimum spacing data for that landing should also be removed from the sum of the minimum spacing requirements (step 260). If it is determined in step 240 that the actual spacing data is reasonable, the method continues to step 260 where the sum of all the minimum spacing requirements corresponding to reasonable actual spacings is calculated. In step 270, the sum of all the reasonable actual spacings is determined. The efficiency score is determined in step 280 by dividing the sum of the minimum spacing requirements (step 260) by the sum of the actual spacings (step 270).

In the preceding specification, the present invention has been described with reference to specific exemplary embodiments thereof. It will, however, be evident that various modifications and changes may be made thereunto without departing from the broadest spirit and scope of the present invention as set forth in the claims that follow. The specification and drawings are accordingly to be regarded in an illustrative rather than restrictive sense.

What is claimed is:

1. A method, comprising:

determining a minimum spacing requirement for each of a plurality of aircraft landings;

determining an actual spacing for each of the plurality of aircraft landings;

calculating an efficiency score based on the actual spacing and the minimum spacing requirements for the plurality of aircraft landings; and displaying the efficiency score to a user.

2. The method of claim 1, wherein the calculating includes:

summing the minimum spacing requirements for each of the plurality of landings; and summing the actual spacings for each of the plurality of landings.

3. The method of claim 2, wherein the calculating further includes:

dividing the sum of the minimum spacing requirements by the sum of the actual spacings.

4. The method of claim 1, further comprising:

error checking one of the actual spacings; and removing the one of the actual spacings from the efficiency score calculations if the error checking indicates the one of the actual spacings is unreasonable.

5. The method of claim 4, wherein the error checking includes:

inserting an undetected aircraft between two detected aircraft corresponding to the one of the actual spacing;

determining a first minimum spacing between a first one of the detected aircraft and the undetected aircraft;

determining a second minimum spacing between a second one of the detected aircraft and the undetected aircraft; and summing the first and second minimum spacings.

6. The method of claim 5, wherein the one of the actual spacings is determined be unreasonable if a value of the actual spacing is greater than the sum of the first and second minimum spacings.

7. The method of claim 1, wherein the minimum spacing requirement is based on one of a weather condition, a type of aircraft and an aircraft size.

8. The method of claim 1, further comprising:

adjusting the actual spacings based on an assumed error value in the data.

9. The method of claim 1, wherein the plurality of landings is based on one of a predetermined time period, a user selected time period, a predetermined number of landings and a user selected number of landings.

10. A system, comprising:

a calculation arrangement receiving a minimum spacing requirement and an actual spacing for each of a plurality of aircraft landings and calculating an efficiency score based on the actual spacing and the minimum spacing requirements for the plurality of aircraft landings; and a data distribution arrangement for generating a displayable file and distributing the efficiency score to users of the system.

11. The system of claim 10, further comprising:

a data receiving arrangement receiving the actual spacings for the plurality of landings from a data source.

12. The system of claim 11, wherein the data source is a passive radar system.

13. The system of claim 11, wherein the data receiving arrangement further receives information relating to the minimum spacing requirements and the calculation arrangement determines the minimum spacing requirements based on the information.

14. The system of claim 13, wherein the information includes one of a weather condition, a type of aircraft and an aircraft size.

15. The system of claim 10, wherein the calculation arrangement sums the minimum spacing requirements and the actual spacings for each of the plurality of landings to calculate the efficiency score.

16. The system of claim 15, wherein the calculation arrangement divides the sum of the minimum spacing requirements by the sum of the actual spacings to calculate the efficiency score.

17. The system of claim 10, wherein the calculation arrangement further error checks one of the actual spacings and removes the one of the actual spacings from the efficiency score calculations if the error checking indicates the one of the actual spacings is unreasonable.

18. The system of claim 17, wherein the error checking includes inserting an undetected aircraft between two detected aircraft corresponding to the one of the actual spacing, determining a first minimum spacing between a first one of the detected aircraft and the undetected aircraft, determining a second minimum spacing between a second one of the detected aircraft and the undetected aircraft and summing the first and second minimum spacings.

19. The system of claim 18, wherein the calculation arrangement determines the one of the actual spacings to be unreasonable if a value of the one of the actual spacings is greater than the sum of the first and second minimum spacings.

20. A system comprising a memory storing a set of instructions and a process executing the set of instructions, the set of instructions being operable to:

determine a minimum spacing requirement for each of a plurality of aircraft landings;

determine an actual spacing for each of the plurality of aircraft landings; and calculate an efficiency score based on the actual spacing and the minimum spacing requirements for the plurality of aircraft landings.

* * * * *